United States Patent
Metz et al.

(10) Patent No.: US 11,230,448 B2
(45) Date of Patent: Jan. 25, 2022

(54) ACTUATED HEAD PAD FOR LOADING DOCK

(71) Applicant: DL Manufacturing Inc., North Syracuse, NY (US)

(72) Inventors: Donald L. Metz, Kirkville, NY (US); Kyle J. Berean, Chittenango, NY (US); Kristian P. Garrow, Cortland, NY (US)

(73) Assignee: DL Manufacturing, Inc., North Syracuse, NY (US)

( * ) Notice: Subject to any disclaimer, the term of this patent is extended or adjusted under 35 U.S.C. 154(b) by 0 days.

(21) Appl. No.: 16/241,978

(22) Filed: Jan. 7, 2019

(65) Prior Publication Data
US 2019/0210820 A1 Jul. 11, 2019

Related U.S. Application Data

(60) Provisional application No. 62/613,772, filed on Jan. 5, 2018.

(51) Int. Cl.
| | |
|---|---|
| *E04B 1/34* | (2006.01) |
| *E04H 14/00* | (2006.01) |
| *B65G 69/00* | (2006.01) |
| *B65G 69/28* | (2006.01) |

(52) U.S. Cl.
CPC ....... *B65G 69/008* (2013.01); *B65G 69/2876* (2013.01)

(58) Field of Classification Search
CPC .. B65G 69/008; B65G 69/28; B65G 69/2805; B65G 69/287; B65G 69/2876; B65G 69/2888; B65G 69/30

USPC .............................................. 52/2.12, 173.2
See application file for complete search history.

(56) References Cited

U.S. PATENT DOCUMENTS

| | | | | |
|---|---|---|---|---|
| 3,391,503 | A * | 7/1968 | O'Neal | B65G 69/008 52/2.13 |
| 3,665,997 | A * | 5/1972 | Smith | E06B 1/522 52/173.2 |
| 4,070,801 | A * | 1/1978 | O'Neal | B65G 69/008 52/173.2 |
| 4,873,801 | A * | 10/1989 | Winters | B65G 69/008 52/173.2 |
| 5,195,285 | A * | 3/1993 | Alten | B65G 69/008 52/173.2 |
| 5,282,342 | A * | 2/1994 | Brockman | B65G 69/008 52/173.2 |
| 5,675,945 | A * | 10/1997 | Giuliani | B65G 69/008 49/312 |

(Continued)

*Primary Examiner* — Brian E Glessner
*Assistant Examiner* — James J Buckle, Jr.
(74) *Attorney, Agent, or Firm* — Barry F. Manna

(57) ABSTRACT

A head pad assembly includes a plurality of head pad subassemblies pivotably joined along their lateral edge so as to allow vertical rotation of one subassembly relative to an adjoining subassembly when the head pad is actuated. At least one head pad subassembly includes a stiff upper backing portion and a lower compressible pad. The head pad assembly further includes one or more flexible hinges coupling the plurality of head pad subassemblies along their lateral edges to effect the vertical rotation. The head pad assembly further includes an actuator assembly configured to raise and lower the plurality of head pad subassemblies between an upper position and a lower, sealing position.

13 Claims, 16 Drawing Sheets

(56) References Cited

U.S. PATENT DOCUMENTS

| | | | | |
|---|---|---|---|---|
| 5,953,868 A * | 9/1999 | Giuliani | ............... | B65G 69/008 52/173.2 |
| 6,205,721 B1 * | 3/2001 | Ashelin | ............... | B65G 69/008 52/173.2 |
| 6,233,885 B1 * | 5/2001 | Hoffmann | ............ | B65G 69/008 52/173.1 |
| 6,425,214 B1 * | 7/2002 | Boffeli | ................ | B65G 69/008 52/173.2 |
| 9,944,474 B2 * | 4/2018 | Heim | ................... | B65G 69/008 |
| 2004/0163326 A1 * | 8/2004 | Miller | ................... | B65G 69/008 52/2.12 |
| 2006/0090407 A1 * | 5/2006 | Hoffmann | ................. | E06B 3/80 52/173.2 |
| 2015/0007509 A1 * | 1/2015 | Digmann | ................ | E04B 1/344 52/173.2 |
| 2015/0007510 A1 * | 1/2015 | Digmann | ............. | B65G 69/008 52/173.2 |
| 2015/0007513 A1 * | 1/2015 | Digmann | ............. | B65G 69/008 52/173.2 |

* cited by examiner

ACTUATED HEAD PAD FOR LOADING DOCK

CROSS REFERENCE TO RELATED APPLICATIONS

Reference is made to and this application claims priority from and the benefit of U.S. Provisional Application Ser. No. 62/613,772, filed Jan. 5, 2018, entitled "ACTUATED HEAD PAD FOR LOADING DOCK", which application is incorporated herein in its entirety by reference.

BACKGROUND OF THE INVENTION

This disclosure relates generally to sealing devices for loading docks and, more specifically, to an actuated head pad.

Most warehouses, manufacturing facilities and large retail stores include loading docks that provide a location for loading and unloading trucks and trailers. Loading docks typically include an opening in the dock wall sufficiently large to accommodate the interior region of all types of trucks and trailers. A raised loading platform positioned below the opening is roughly even with the loading dock floor. A truck or trailer backs up toward the loading dock until the rear of the cargo compartment engages the dock. The cargo compartment of the truck is thus roughly aligned with the opening of the loading dock. The truck or trailer may have an overhead door or, more commonly, hinged panel doors that swing open and are stowed against the side of the trailer.

The loading platform may include a dock leveler that provides a ramp to compensate for height differences between the loading platform and the floor of the trailer cargo area. The leveler pivots between downwardly inclined, upwardly inclined, or horizontal positions to permit forklift trucks and personnel to readily move in and out of the trailer cargo area during loading and unloading operations.

In some loading dock operations, there is a large temperature difference between the inside of the truck cargo area and the outside environment, or between the interior of the loading bay and the outside environment, or both. For example, a refrigerated trailer may dock to a refrigerated loading bay, and there may be a large temperature difference between the vehicle cargo area/loading bay and the outside environment. The cargo may include perishable items or items required to be kept cold to comply with government regulations. Both the trailer's refrigerated cargo area and the refrigerated loading bay may be controlled to approximately the same temperature, but the outside environment may be significantly warmer. In another example, the loading bay may be part of a building situated in a cold climate. The loading bay may be heated to a comfortable temperature for employees, while the outside temperature may be well below freezing. In yet another example, the loading bay may be in a building located in a hot climate. The loading bay may be air-conditioned to a comfortable temperature for employees, while the outside temperature may be hot and humid.

In each of the above examples, if the cargo area of the truck is not properly sealed against the loading dock door, gaps will form and permit leakage between the ambient air and the temperature-controlled environment. Sealing the cargo area of the vehicle from outdoor environmental conditions can be an important requirement of a loading dock structure, particularly when the cargo and the receiving dock are refrigerated. To address this need, dock seals and dock shelters have been designed to prevent the ingress of outdoor environmental conditions or contaminants (e.g., rain, snow, wind, hot/cold temperatures, insects, animals, etc.) into the interior of the dock area and cargo area of the vehicle during the loading or unloading of the vehicle. Dock shelters and dock seals also address the need to prevent the egress of refrigerated air from within the loading bay and/or vehicle cargo area to the outdoor environment.

Typically, dock seals and dock shelters include vertical members along opposing sides of the loading bay door and a horizontal head pad extending across the top of the door opening. The pads are commonly made from a wear-resistant fabric (e.g., urethane-coated fabric) surrounding a resilient material such as foam that is compressed when the back of the truck or trailer is positioned against the loading dock. However, the head pad often experiences much more wear than the side pads, and can become dislodged from its mounting structure, resulting in loss of seal and eventually expensive and time-consuming replacement.

SUMMARY OF THE INVENTION

In accordance with one aspect of the disclosure, a mechanically-actuated head pad assembly for a loading dock includes a plurality of head pad subassemblies pivotably joined along their lateral edge so as to allow vertical rotation of one subassembly relative to an adjoining subassembly when the head pad is actuated. At least one head pad subassembly includes a stiff upper backing portion and a lower compressible pad. The head pad assembly further includes one or more flexible hinges coupling the plurality of head pad subassemblies along their lateral edges to effect the vertical rotation. The head pad assembly further includes an actuator assembly configured to raise and lower the plurality of head pad subassemblies between an upper position and a lower position. The upper position is not configured to provide a sealing function against a trailer, and the lower position is configured to engage and seal the compressible pad against a roof surface of the trailer. One of the plurality of head pad subassemblies is pivotably joined along a lateral edge to a stationary structure.

In one embodiment, the flexible hinges are formed of heavy gauge vinyl.

In accordance with another aspect of the disclosure, a head pad assembly for a loading dock includes a back plate having a forward end and an opposing rear end proximate to a wall of the loading dock, and a compressible pad coupled to the back plate. The pad is positioned above and extends across an opening to the loading dock. The head pad assembly further includes a hinge element coupled to a stationary structure. The hinge element is configured to provide pivotal rotation of the back plate and pad between an upper position and a lower position, wherein the upper position is not configured to provide a sealing function against a trailer, and the lower position is configured to engage and seal the compressible pad against a roof surface of the trailer. The head pad assembly further includes an actuator assembly configured to raise and lower the back plate and pad between the upper position and the lower position.

In accordance with yet another aspect of the disclosure, a mechanically-actuated head pad assembly for a loading dock includes a stiff upper backing portion, a lower compressible pad, and a flexible hinge coupling the upper backing portion along its lateral edge to effect a vertical rotation. The head pad assembly further includes an actuator assembly configured to raise and lower the upper backing portion between an upper position and a lower position, wherein the upper position is not configured to provide a sealing function against a trailer, and the lower position is configured to engage and seal the compressible pad against a roof surface of the trailer.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
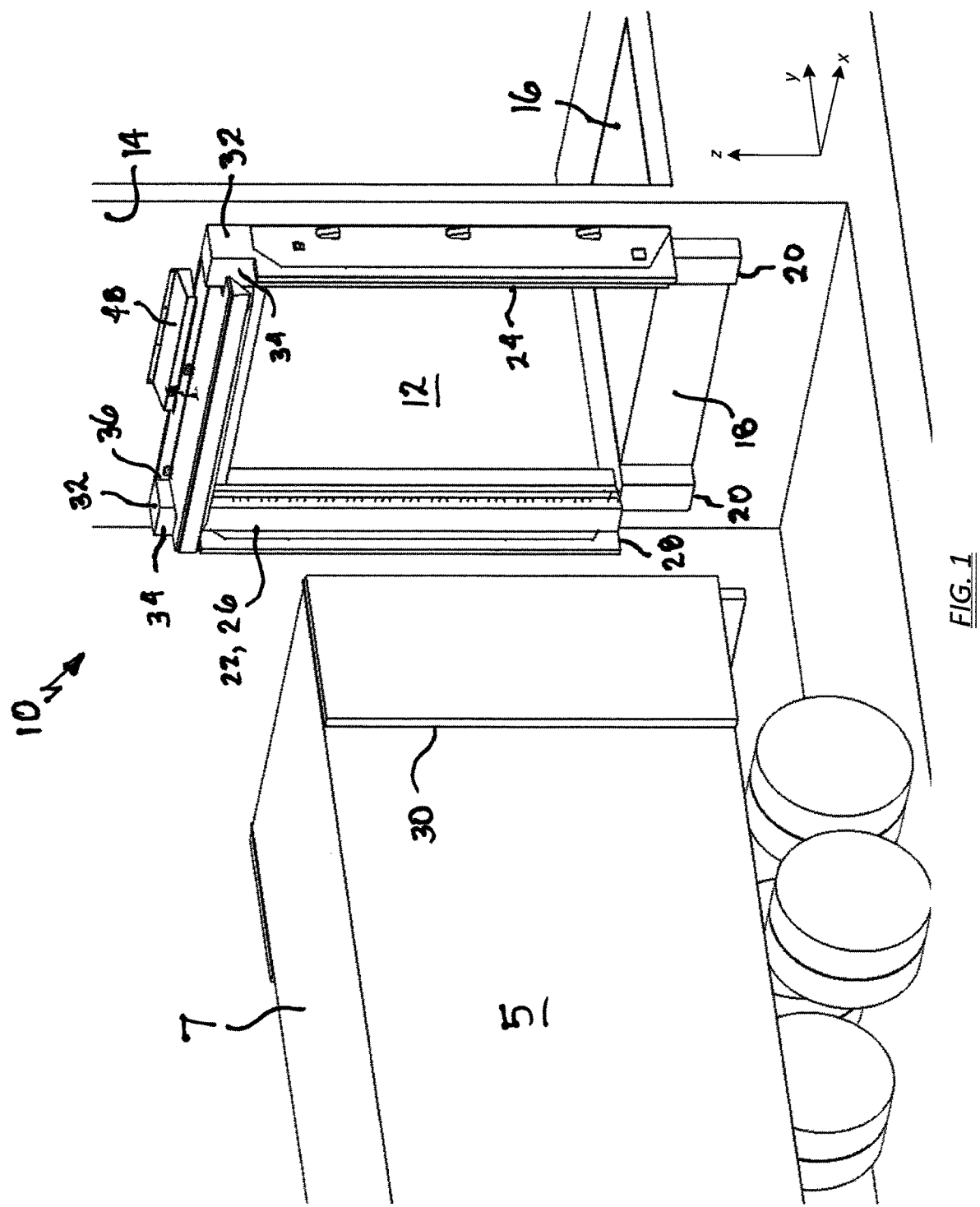
FIG. 1 depicts a perspective plan view of a head pad assembly according to one embodiment of the invention, the view taken outside the building looking in towards the loading bay.

Conventional dock seal structures include two vertical seal members on either side of the door opening and a horizontal head pad over the door opening. Typically, a trailer backs into the pliant dock seal structure to compress it and form a face seal along the vertical and horizontal edges of the trailer frame. One noted difficulty with loading dock operations is that a trailer will move downwards or upwards as much as four inches as the weight of the cargo increases or decreases during loading or unloading. As a result, the trailer's vertical displacement may unseat the face seal formed between the top edge of the trailer frame and the head pad structure. In addition, during loading and unloading operations a forklift moving in and out of the trailer often causes the trailer to 'bounce' which can disrupt the face seal and chafe the head pad material.

Another noted problem arises from differing trailer heights and door openings. In particular, some taller trailers may squash the bottom of the head pad into the door opening, such that it may obstruct loading and unloading operations. The exposed, obstructing portion of the head pad may be subject to repeated hits by pallets and the like, resulting in damage to the head pad, such as ripping and tearing.

Yet another noted problem with conventional head pad structures arises when the trailer is positioned with a trailer jockey (or yard jockey). The trailer jockey raises the front of the trailer higher than the back end, and when the back end is pushed into the pliant dock seal structure, the trailer is actually pivoted and the contact force is concentrated along the upper edge of the trailer frame, rather than equally distributed over the entire face of the frame. In a worst case scenario, the pivot angle is large enough to cause the top of the trailer to hit the building before bottom of the trailer contacts the loading dock bumpers. When the jockey lowers the trailer, the pivot angle decreases but the rotation of the top edge of the trailer frame, which is jammed into the head pad, can cause large shearing forces that may result in damage to the head pad, such as ripping and tearing. If the jockey is not removed prior to loading or unloading operations, as is sometimes the case, large shearing forces in the head pad can still occur as the trailer moves up or down due to the weight of the cargo increasing or decreasing.

Embodiments of the present invention solve these problems by providing a head pad assembly that lowers down onto the roof of the trailer. The head pad assembly includes an actuated head pad portion that is pivotable between an upper position and a lower position. The head pad remains in the upper position above the loading dock opening until the trailer engages the vertical seals and bumper, then the resilient head pad is lowered. The rear portion of the head pad (closest to the loading dock wall) is configured with a hinge arrangement. The hinge arrangement can be secured to the loading dock wall or the vertical seals. The front portion of the head pad includes a lifting bracket. A cable is secured to the lifting bracket, and an actuator winds or unwinds the cable to raise or lower the bracket.

Once the trailer fully backs into the vertical seals and encounters the bumper, the head pad is actuated such that it pivots downward to engage the trailer roof. A sufficient pressure or force is applied to hold the head pad against the trailer roof, thereby effecting a seal from the outside environment. Any jarring movement (vertical or otherwise) by the trailer during loading or unloading operations is absorbed by the resiliency of the head pad material. Damage to the head pad caused by shearing forces is eliminated since the head pad engages the trailer roof, and not the face of the trailer frame. Additionally, since the head pad lowers from above the trailer, it will not obstruct the opening when moved to the lower position.

For purposes of illustration and to further explain orientation of certain features of the invention, a lateral axis is defined as substantially parallel to the loading dock wall and is denoted as the x-axis; a longitudinal axis is defined as substantially in the direction of vehicle motion when backing into the loading dock and is denoted as they-axis; and the vertical axis is denoted as the z-axis.

Referring to FIG. 1, a loading dock sealing apparatus 10 is configured to seal the open end of a truck or trailer 5 from the outside environment. The loading dock sealing apparatus 10 surrounds an opening 12 in a loading dock wall 14, which is typically the exterior wall of the building. A loading platform 16 inside the loading dock area is typically at a raised elevation relative to the ground outside, so that the floor of a truck or trailer backing up to the dock will be approximately the same height. The loading dock may include a dock leveler 18 that provides an adjustable ramp to compensate for height differences between the loading platform and the floor of the trailer cargo area and permit forklift trucks and personnel to readily move in and out of the trailer cargo area during loading and unloading operations. The loading dock further includes rubber bumpers 20 affixed to the outside wall 14 to provide a means of stopping a truck or trailer when backing up to the dock. The loading dock sealing apparatus 10 may include a first vertical seal member 22 positioned to one side of the dock opening 12, and a second vertical seal member 24 positioned to the other side of the dock opening 12. The vertical seals 22, 24 may be constructed in a conventional manner. For example, each may be formed of high density polyurethane foam, roughly rectangular or trapezoidal in shape, and overwrapped with a high-grade vinyl skin (e.g., 40 oz. gauge).

Figure 2:
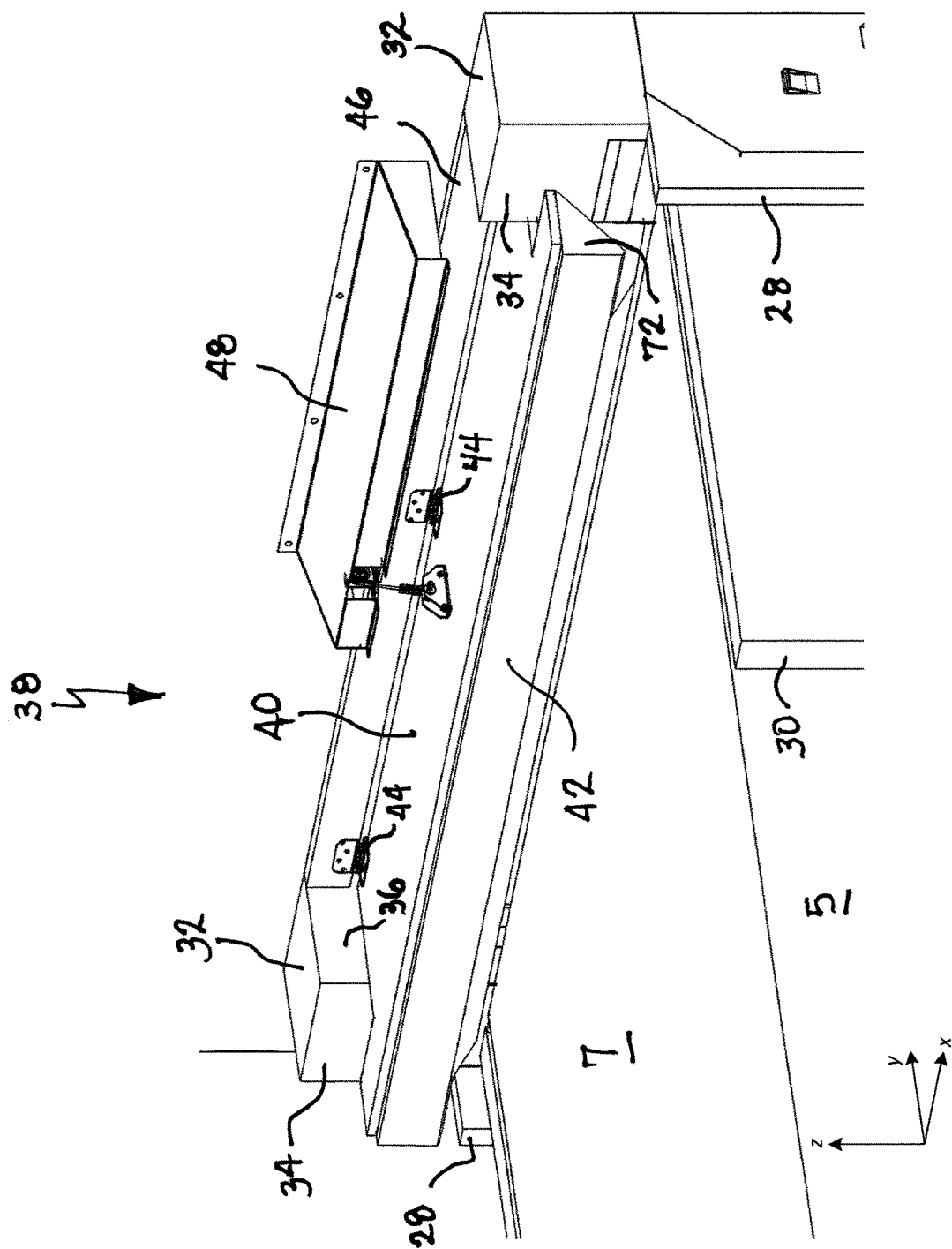
FIG. 2 depicts an enlarged perspective view of a portion of the head pad assembly shown in FIG. 1.

Referring to FIG. 2, the front surface 26 of the vertical seals 22, 24 may be flat, and may further include a secondary wear face (not shown) for added durability in the contact zone, and to provide truck drivers with higher visibility during docking. The vertical seals 22, 24 may further include an outer longitudinally-extending wing 28 that, when the trailer 5 backs into and compresses the front surface 26, folds into and seals against the truck panel doors 30. A vertical seal of this configuration may be purchased from DL Manufacturing, North Syracuse, N.Y.

In one embodiment of the invention, a riser pad 32 may be secured atop each vertical seal 22, 24 to extend the height of the vertical seals 22, 24 and provide additional sealing from the outside environment. In one example, each riser pad 32 comprises the same planform as the vertical seals 22, 24 and includes a front face 34 and an inside face 36. The riser pad 32 can be constructed of the same materials and in essentially the same manner as the vertical seals 22, 24, and may be secured by hook and loop fasteners, glue, or the like.

While the drawings have illustrated the vertical seals 22, 24 as U-seals, it is contemplated that other seal configurations, both conventional and otherwise, may be utilized without departing from the scope of the invention. For example, the vertical seals may be roughly rectangular or trapezoidal in cross section.

The loading dock sealing apparatus 10 further includes a mechanically actuated head pad assembly 38 moveable between an upper, non-sealing position and a lower, sealing position. Stated another way, the head pad 38 rotates in a downward motion to compress and seal against the roof of the docked trailer, then rotates upward away from the roof when loading operations are complete and trailer is ready to be moved.

The head pad assembly 38 can include a stiff back plate 40 and a compressible pad 42. The back plate 40 can provide strength and dimensional stability to the head pad assembly 38. In the illustrated embodiment, the back plate 40 comprises an upper layer of the head pad assembly 38, and the pad 42 comprises a lower layer. The back plate 40 may be formed of any suitably strong material capable of withstanding the corrosive weather elements. Non-limiting examples include wood, plastic or PVC wood, tough polymers, aluminum, steel, or conveyor belt material. In the illustrated example, the back plate 40 is formed from ¾-inch plywood. The compressible pad 42 can be configured to provide an environmental seal against the trailer roof 7 to seal off the dock opening 12 from outside conditions. In one example, the pad 42 can be formed of polyurethane foam. The pad 42 may be glued to the back plate 40, for example, or secured with fasteners. In one embodiment of the invention, the back plate 40 and pad 42 can be overwrapped with a heavy gauge vinyl skin, similar to the vinyl overwrap used on the vertical seals 22, 24.

The head pad assembly 38 may further include at least one hinge element 44 secured to a stationary structure such as the loading dock wall 14. In one example, one leaf of the hinge element 44 can be fastened to the rear side (i.e., proximate the wall 12) of the back plate 40, and the opposing leaf can be secured to a mounting block 46 that is anchored to the dock outer wall 12. In one example, the mounting block 46 can be formed from 2×8 lumber. Other rotating bearing elements are contemplated within the scope of the present invention. For example, it is contemplated the hinge element 44 can also be secured to the inside face 36 of the vertical seals 22, 24. In this configuration, the hinge element 44 may comprise a rotating dowel or bearing (not illustrated) to provide the pivot point.

The head pad assembly 38 may further include an actuator cover 48 to protect an actuator assembly 50 (FIG. 3) from the weather elements. The actuator cover 48, which may be bolted directly to the loading dock wall 14, can include structural members to not only support the canopy roof, but also provide structural support for the head pad actuator components.

Figure 3:
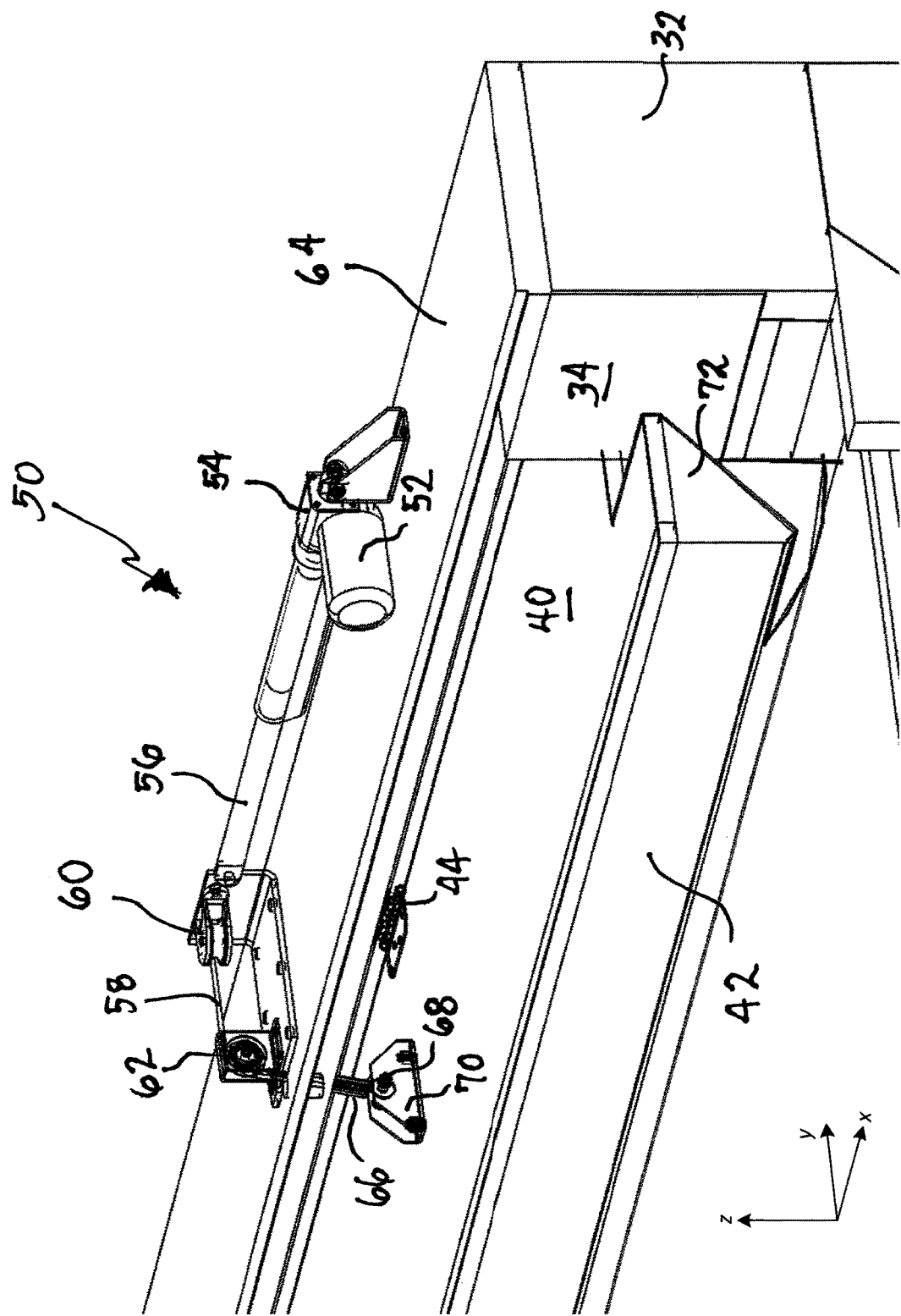
FIG. 3 depicts an enlarged, alternate view of FIG. 2.

Turning to FIG. 3, shown is an enlarged view of the head pad assembly 38 with the actuator cover 48 removed. The head pad assembly 38 can include an actuator assembly 50 configured to rotate the back plate 40 and compressible pad 42 between the upper position and the lower position. In one embodiment of the invention, the actuator assembly 50 includes a motor 52 and a linear drive actuator 54, which may be mounted essentially horizontally in a lateral orientation to save space under the actuator cover 48. A cable and pulley system may be utilized to convert the horizontal travel of the actuator shaft 56 to a vertical motion. In one example, a length of 3/16" steel cable 58 may be secured to the tip of the actuator shaft 56, passed over a horizontal pulley 60 to translate the cable 58 to a longitudinal direction, then passed over a vertical pulley 62 to translate the cable 58 to a vertical orientation, then passed through the header assembly 64 where it terminates to a rotatable eyelet 66. The eyelet 66 rotates about a shoulder bolt 68 fastened to a pad bracket 70 secured to the back plate 40. In operation, extending the actuator shaft 56 laterally will slacken the cable 58, causing the head pad assembly 38 to drop. Since the head pad assembly 38 is hinged on the rear side, it will rotate downwards about the hinge point until the pad 42 comes to rest upon the trailer roof 7.

In some constructions, the actuator assembly 50 may be positioned underneath the header assembly 64. The header assembly 64 can be supported by the mounting block 46, which is in turn secured to the loading wall 14. Thus, the header structure can support the actuator assembly 50 being mounted either on top or underneath the header. By positioning it underneath, the header assembly 64 can protect the actuator assembly 50 from the weather elements, while greatly reducing the cost of the head pad assembly 38 by eliminating the actuator cover 48.

Figure 4:
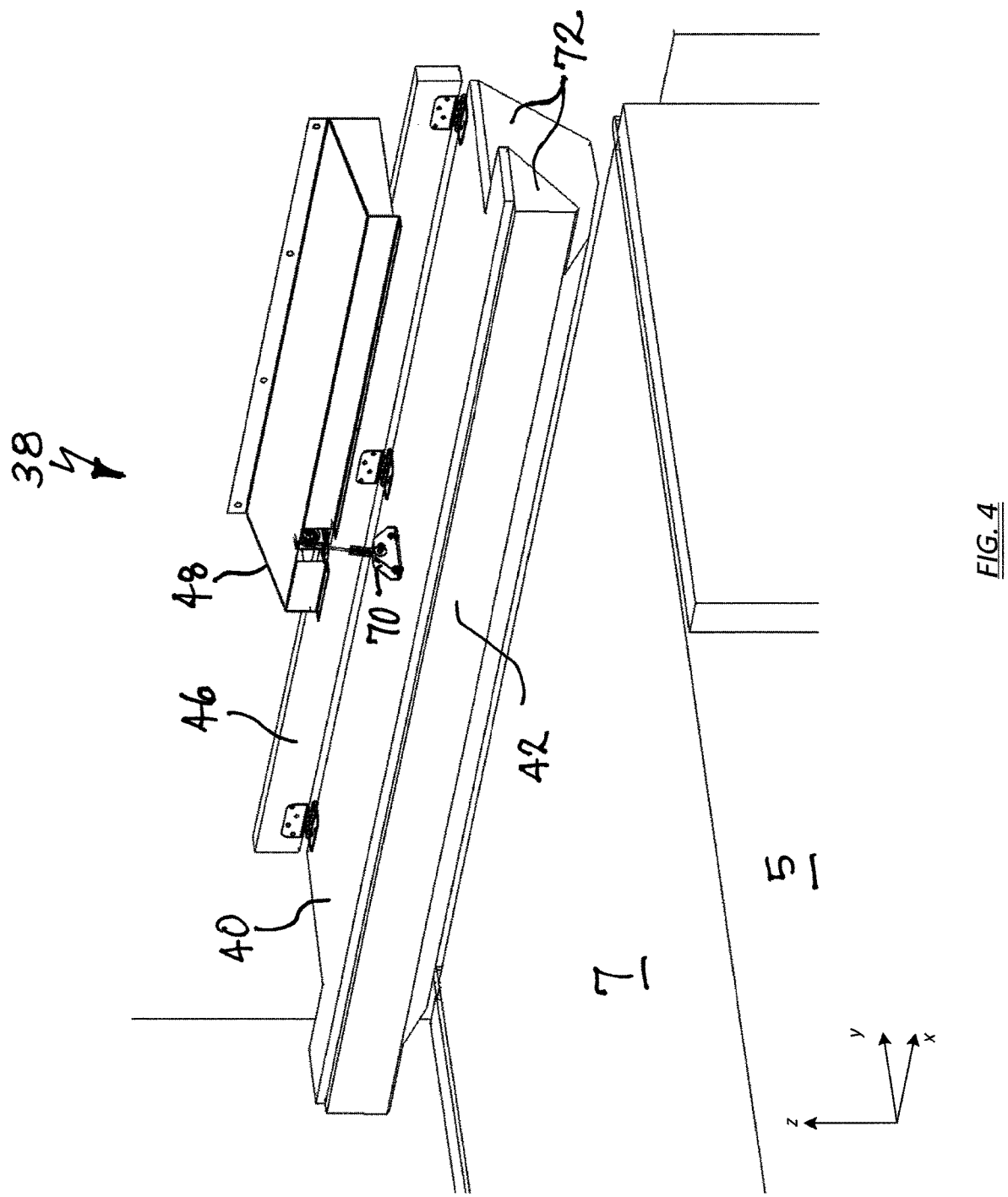
FIG. 4 depicts an alternate view of FIG. 2 with the vertical seals omitted for clarity.
Figure 5:
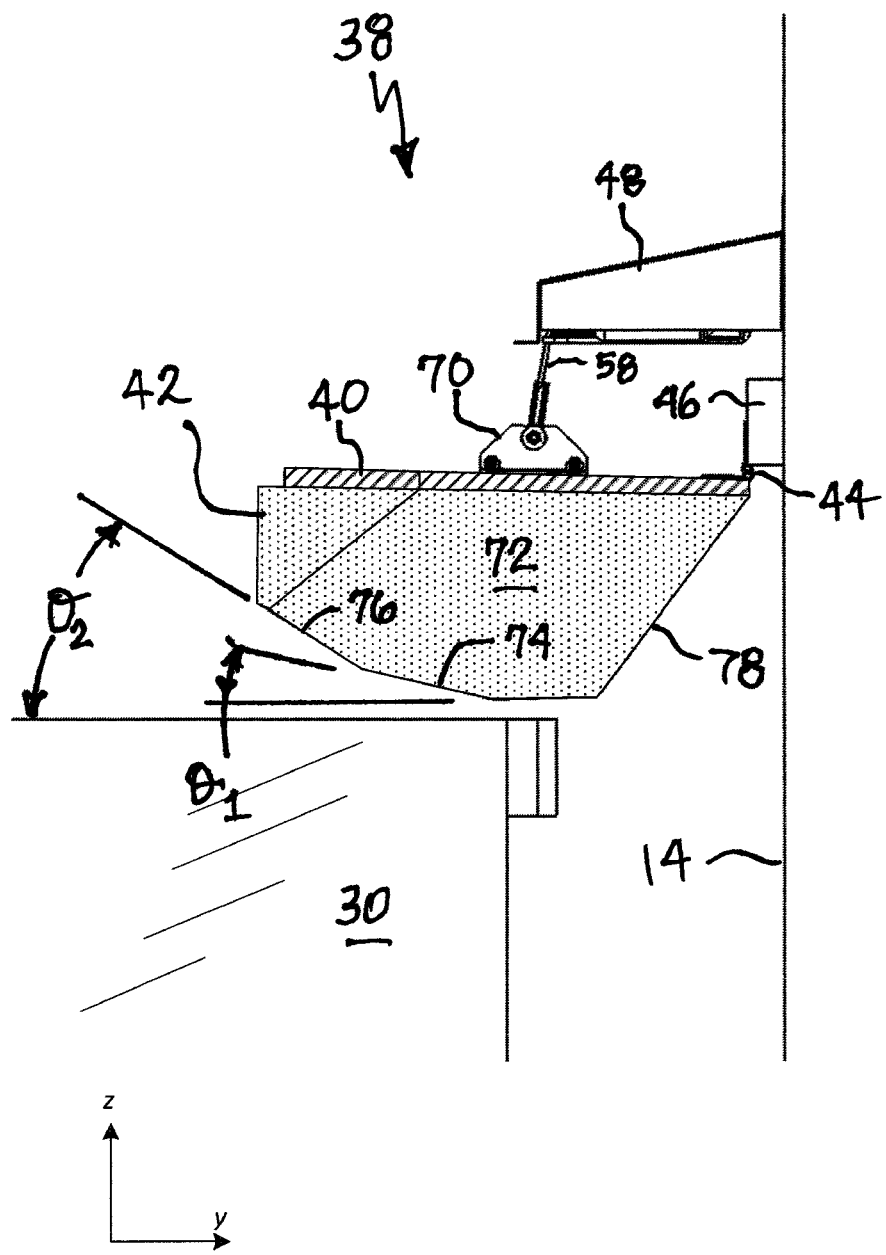
FIG. 5 depicts a side view of the head pad assembly shown in FIG. 4.

FIGS. 4 and 5 depict the head pad assembly 38 in the stowed position, prior to the pad 42 being lowered. FIG. 4 is essentially the same view as FIG. 2, except the vertical seals 22, 24 and riser pad 32 have been removed for clarity. FIG. 5 is a side view of FIG. 4. One important feature of the disclosed head pad assembly 38 is that each side 72 of the compressible pad 42 seals against the front face 34 and inside face 36 of the riser pad 32 (FIG. 2). The compressive properties of the pad 42 have been carefully selected such that, as the pad is compressed against the trailer roof 7, the pad bulges outward laterally and longitudinally, thereby effecting a seal against the riser pad 32 (or vertical seal 22, 24).

Another important feature of the disclosed head pad assembly 38 is that the compressible pad 42 has been configured to seal against virtually any height tractor trailer, even though the rear portion is at a fixed height (hinged to a stationary structure). FIG. 5 depicts a side view of the head pad assembly 38 in the stowed position (i.e., raised and approximately level). In particular, the bottom contour of the pad 42 has several angled surfaces that, when rotated, accommodate differing trailer heights. FIG. 5 illustrates a tall trailer 5 in its farthest longitudinal direction. That is, the trailer has been backed up as far as possible, with its rear bumper against the dock bumpers, and the vertical seals 22, 24 compressed approximately 5 inches. There is only a small gap of several inches between the pad 42 and the trailer roof 7.

Figure 6:
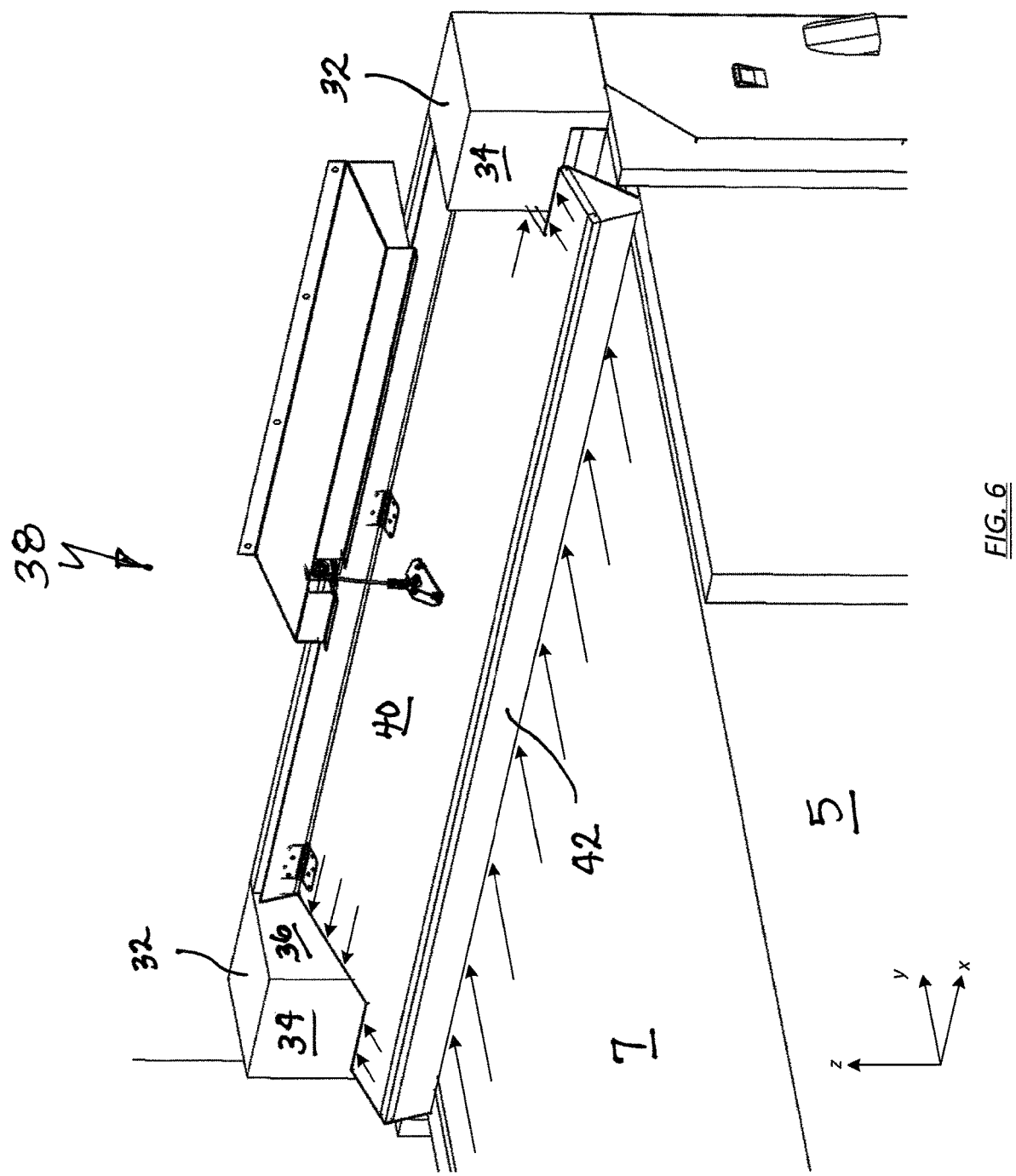
FIG. 6 depicts the head pad assembly shown in FIG. 2 with the head pad in the lowered position.
Figure 7:
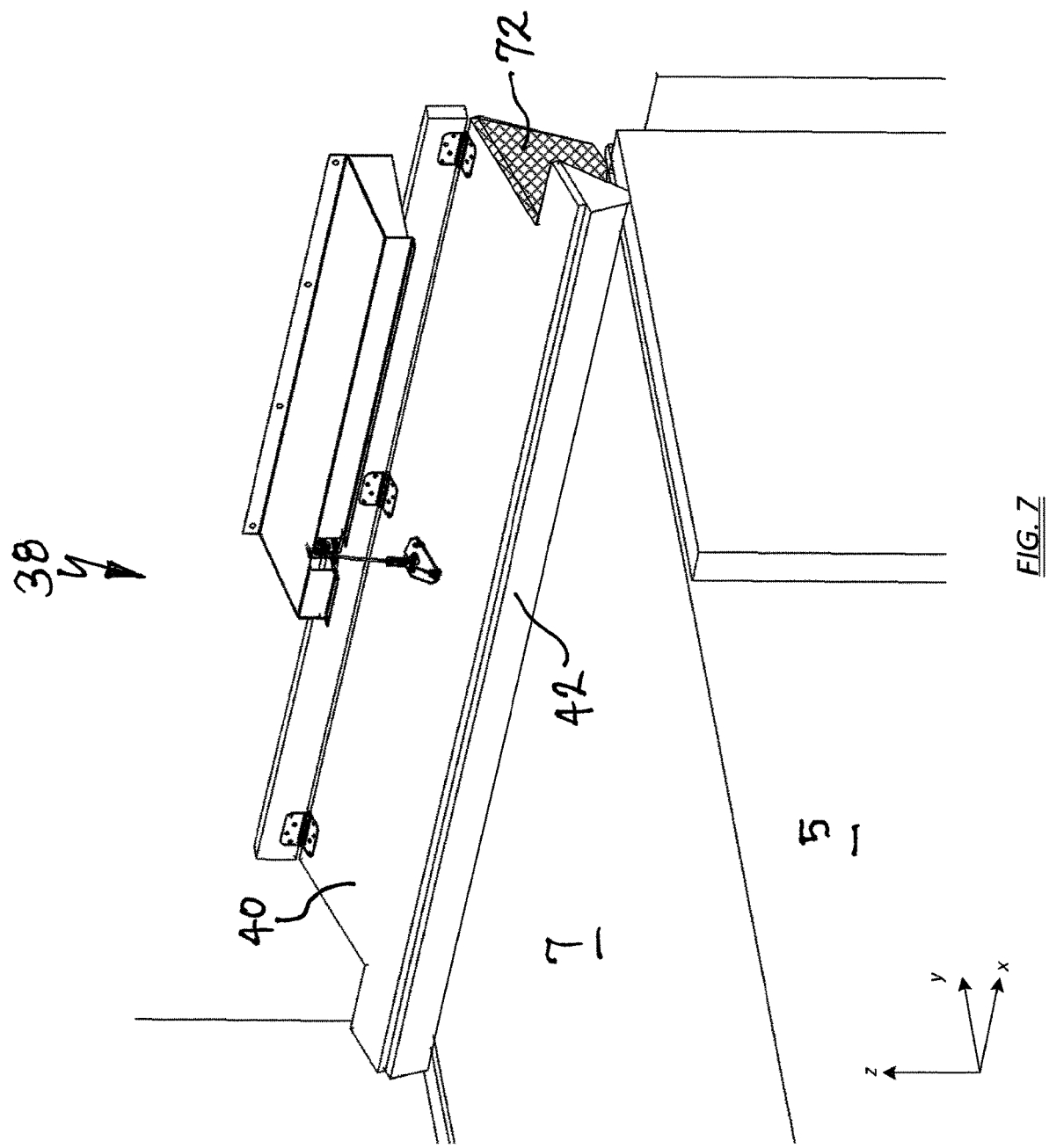
FIG. 7 depicts an alternate view of FIG. 6 with the vertical seals omitted for clarity.
Figure 8:
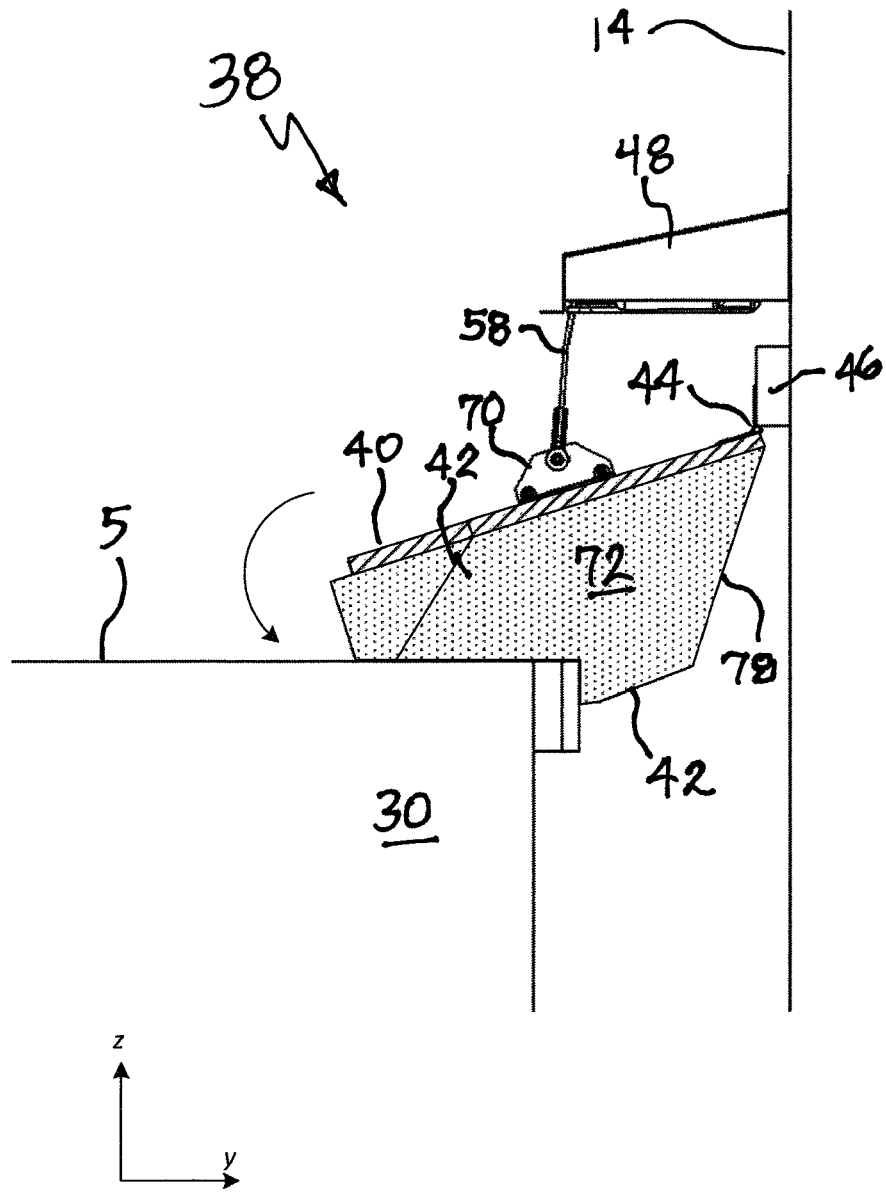
FIG. 8 depicts a side view of the head pad assembly shown in FIG. 7.

FIGS. 6-8 depict the head pad assembly 38 in the lowered position. FIG. 6 illustrates the sealing function along the trailer roof 7, as well as between the side edges of the head pad and the front face 34/inside face 36 of the riser pads 32, as noted by the arrows. Typically, the head pad 38 is wider than the trailer 5 to account for parking misalignment. FIG. 7 is essentially the same view as FIG. 6, except the vertical seals 22, 24 and riser pad 32 have been removed for clarity. The side surfaces 72 of the head pad that make sealing contact with the riser pads and/or vertical seals 22, 24 are shown in cross-hatch. FIG. 8 depicts a side view of the compressed pad 42 and the direction of rotation. Note that the pad 42 seals against the trailer roof, not the rear face of the trailer 5.

Figure 9:
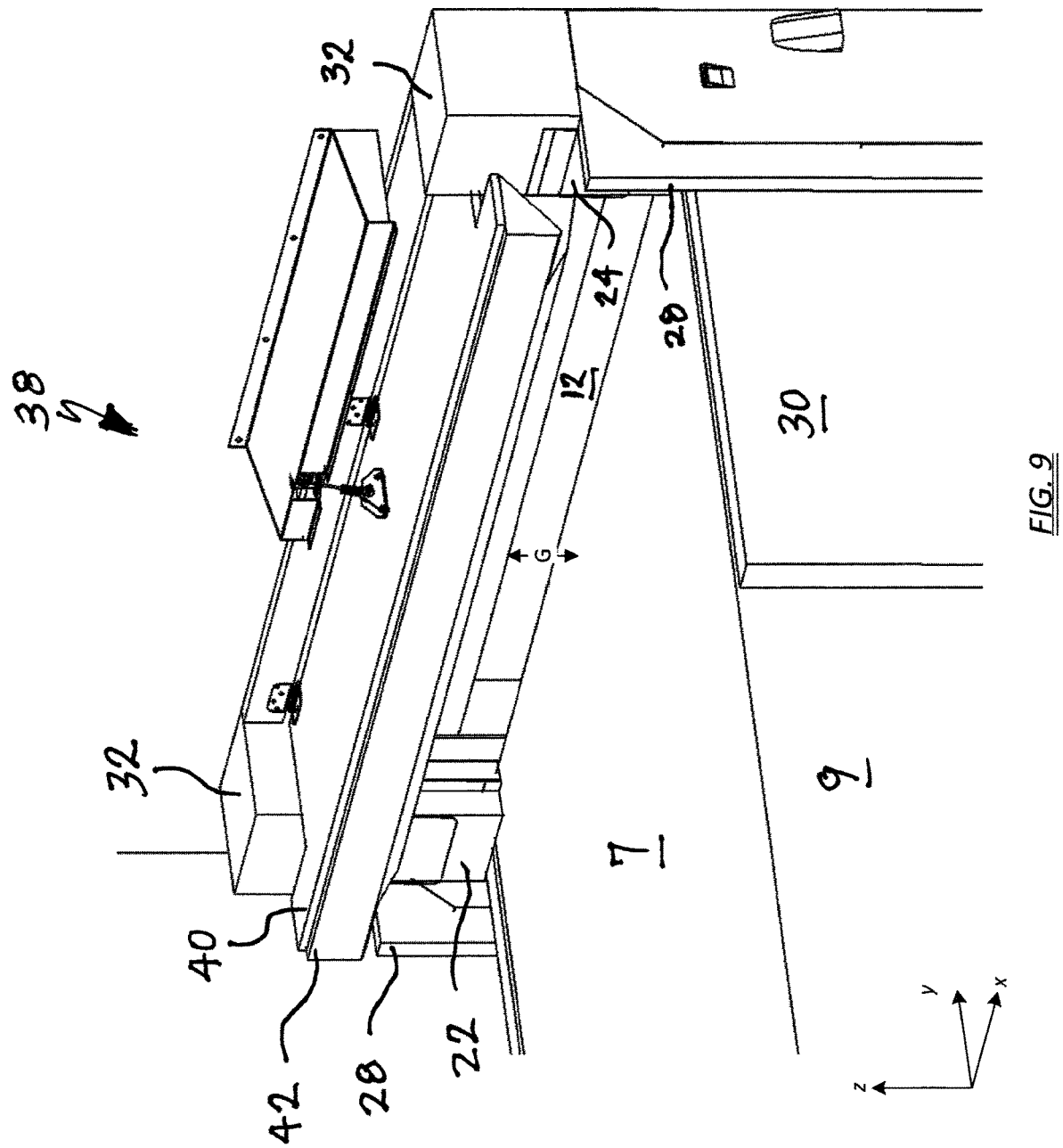
FIG. 9 depicts the head pad assembly shown in FIG. 2 with a short trailer parked.
Figure 10:
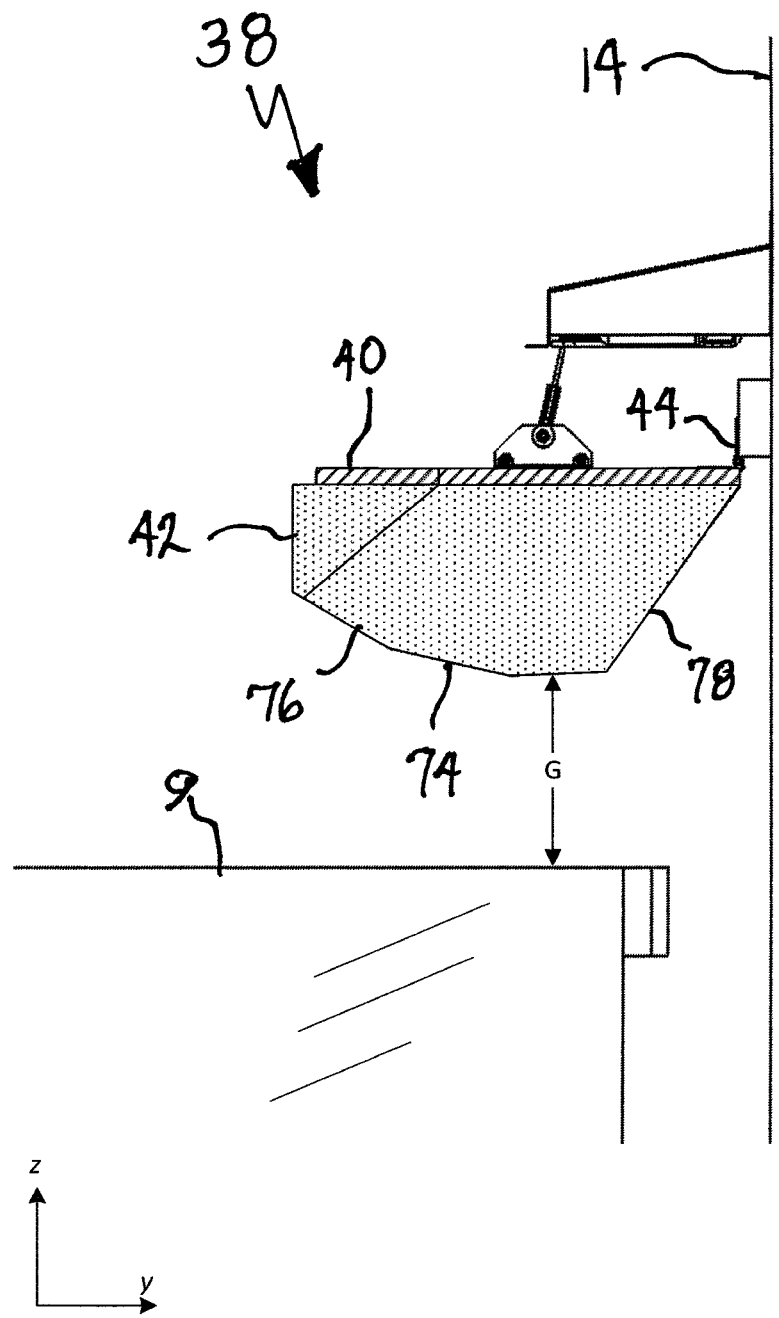
FIG. 10 depicts a side view of the head pad assembly shown in FIG. 9.

FIGS. 9-10 depict the head pad assembly 38 in the stowed position (i.e., raised and approximately level), prior to the pad 42 being lowered. However, the height of the illustrated trailer 9 is one of the shortest expected, so the gap (G) between the pad 42 and the trailer roof 7 is much greater, in the range of 12 to 18 inches.

Figure 11:
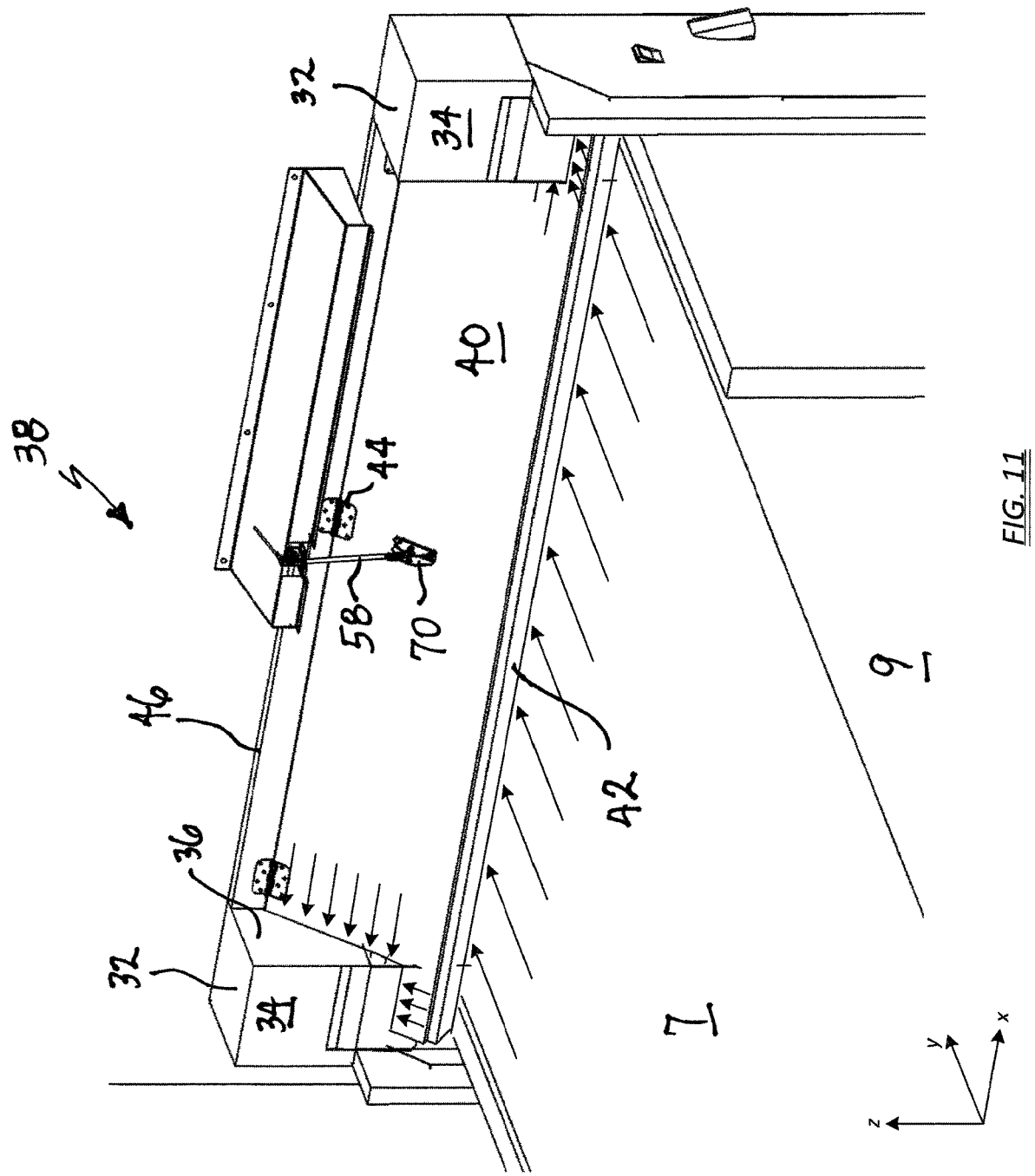
FIG. 11 depicts the head pad assembly shown in FIG. 9 with the head pad in the lowered position.
Figure 12:
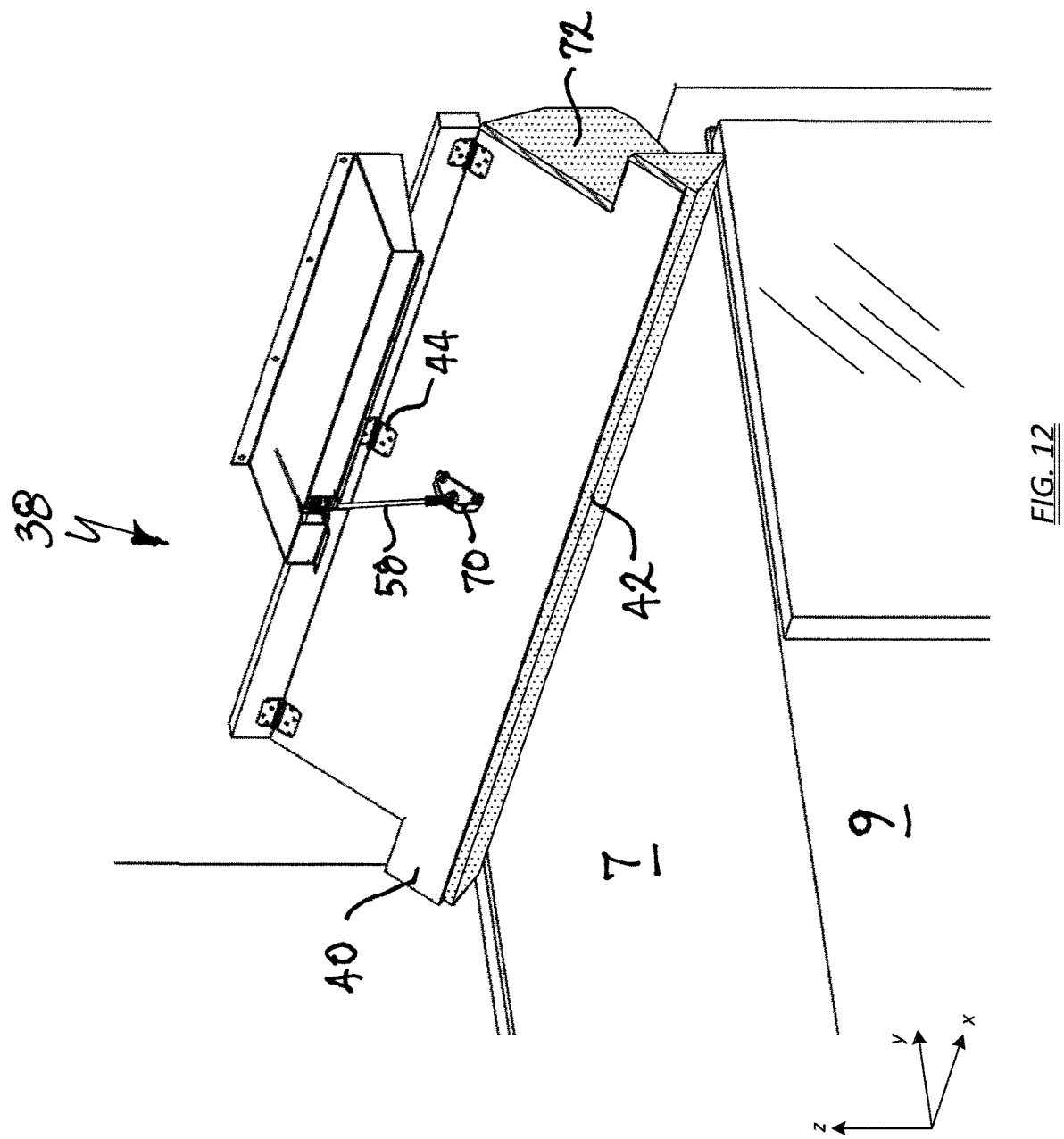
FIG. 12 depicts an alternate view of FIG. 11 with the vertical seals omitted for clarity.
Figure 13:
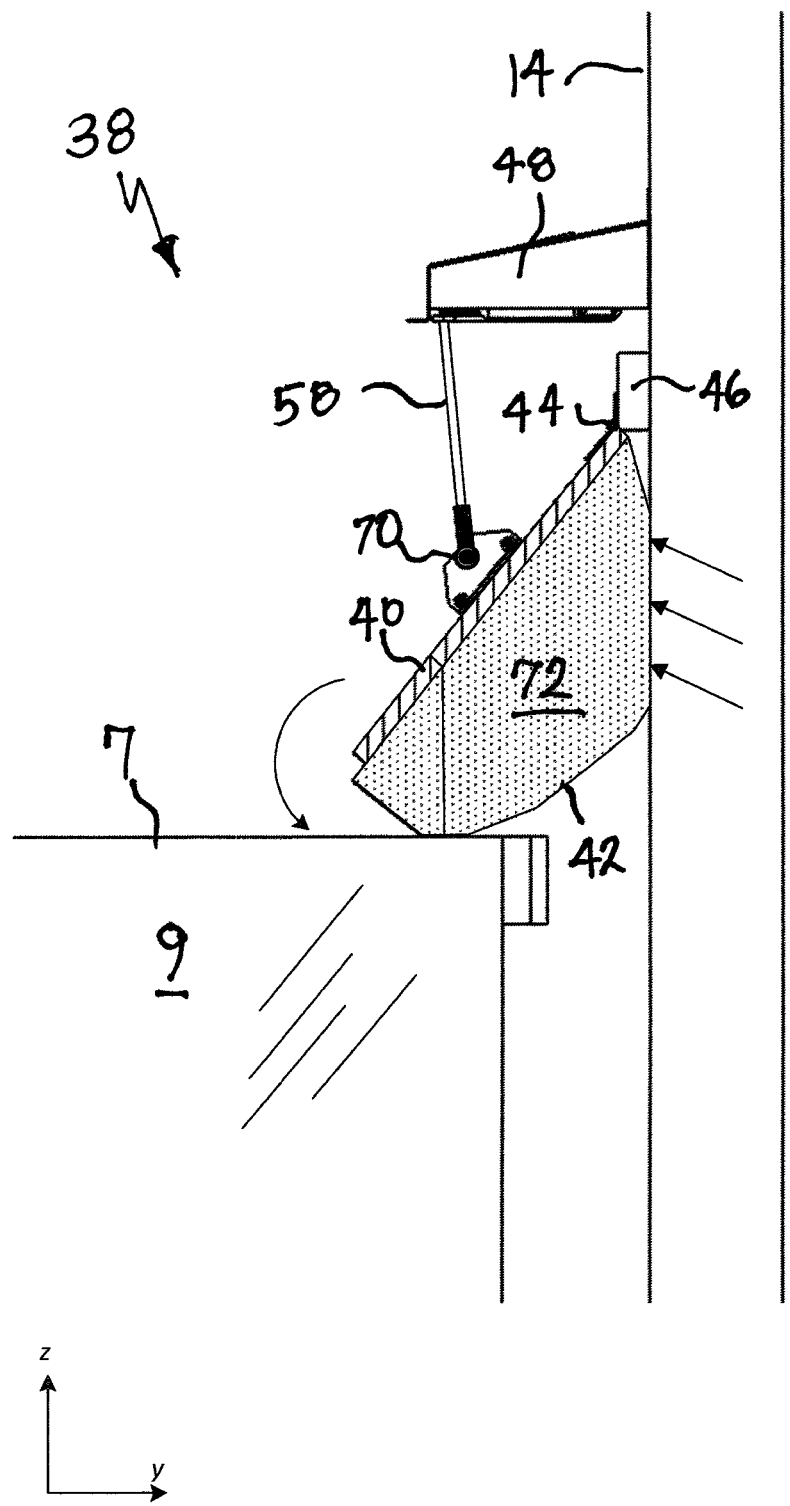
FIG. 13 depicts a side view of the head pad assembly shown in FIG. 11.

FIGS. 11-13 depict the head pad assembly 38 lowered onto the short trailer 9. The head pad angle of rotation required to make contact with the trailer roof 7 is much greater, and the front portion of the pad 42 contacts the roof. In one embodiment, the pad 42 can be configured to also abut and seal against the loading dock wall 14 (shown by arrows). This feature provides an additional measure of assurance that the head pad is adequately sealed. In other configurations with taller trailers, the additional sealing feature may not be required.

Returning now to FIG. 5, one can appreciate that the several angled surfaces of the bottom contour of the compressible pad 42 provide sealing capability for a full range of trailer heights, from smallest (FIG. 10) to tallest (FIG. 5). A flat contour, when rotated, would provide less than ideal sealing functionality. Accordingly, the bottom contour can include a first angled surface 74 having a shallow angle $\theta_1$ greater than zero. In one example, the first angled surface 74 is between 2 degrees and 10 degrees. The first angled surface 74 will tend to flatten out as the head pad body 38 is rotated. Furthermore, the bottom contour can include a second angled surface 76 having an angle $\theta_2$ greater than angle $\theta_1$. In one example, the second angled surface 76 is between 10 degrees and 30 degrees. The bottom contour can also include a third angled surface 78 on the rear side of the pad, opposing the first and second angled surfaces, configured to seal against the loading dock wall 14 when the trailer is on the short side of the spectrum.

Figure 14:
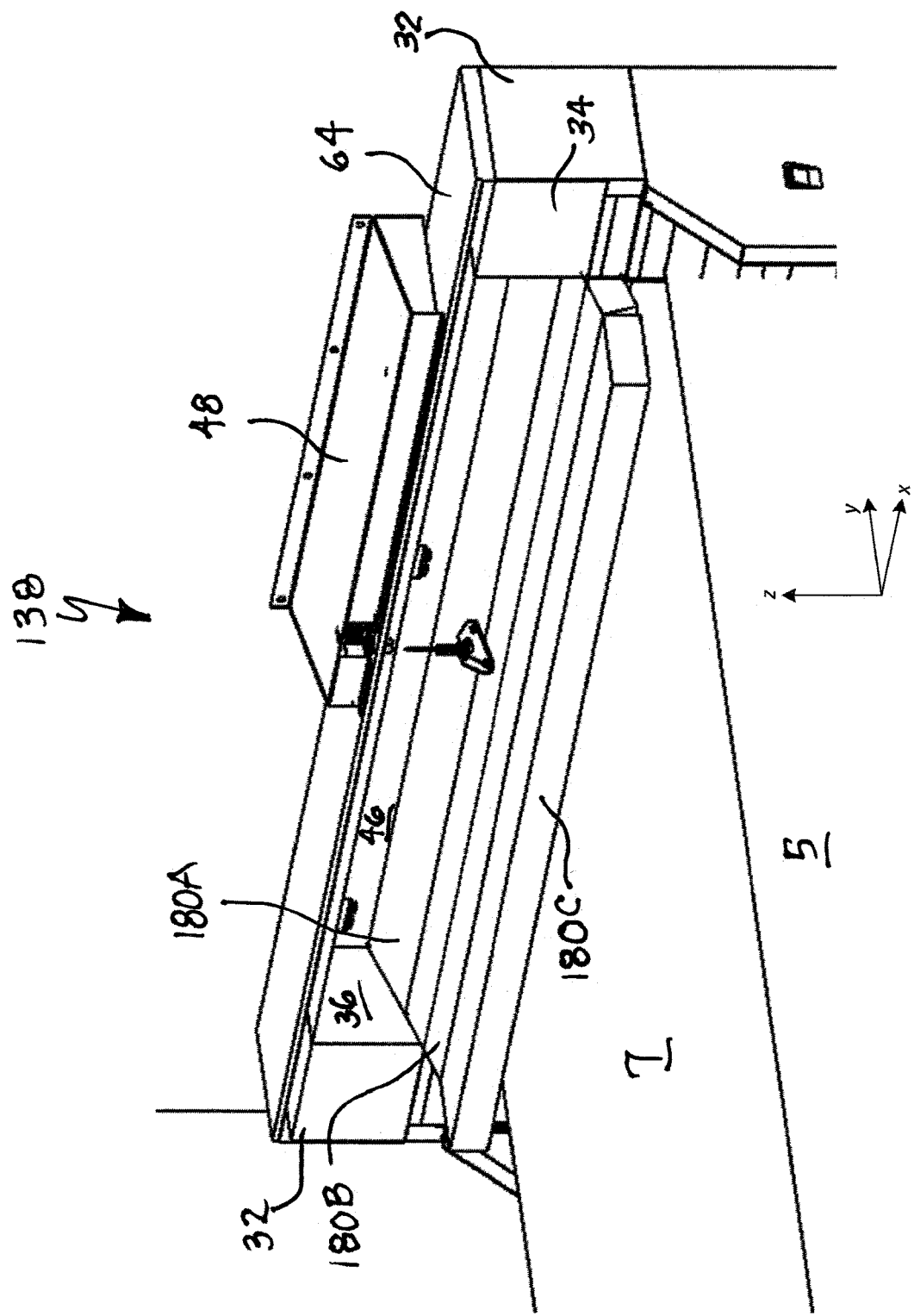
FIG. 14 depicts a perspective view of a head pad assembly according to another embodiment of the invention.
Figure 15:
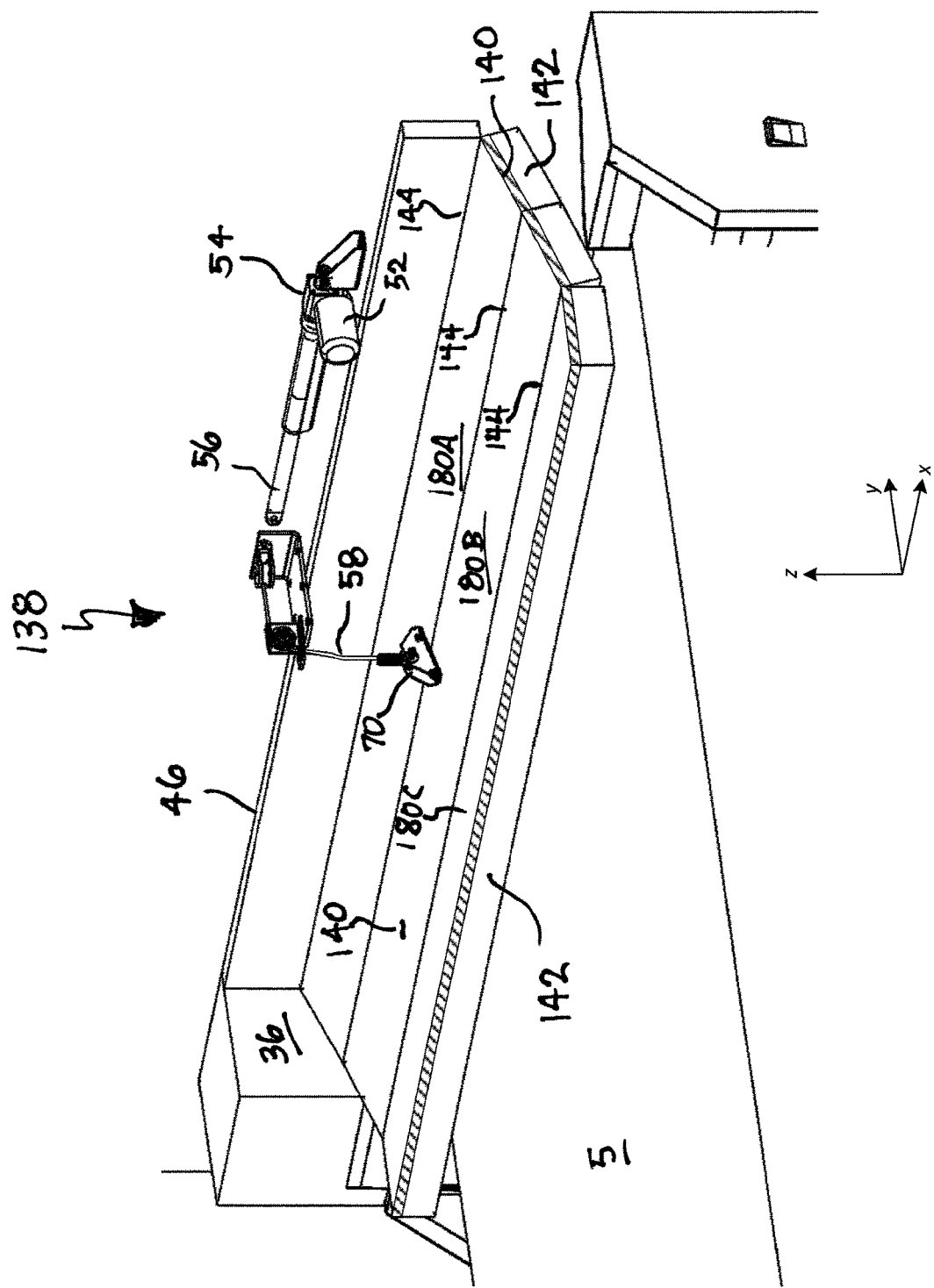
FIG. 15 depicts an alternate view of FIG. 14, except the following elements are omitted for clarity: a portion of the right-side vertical seal, the actuator cover, and the header assembly.

Turning now to FIGS. 14 and 15, wherein like element numbers indicate like parts from FIGS. 1-13, a head pad assembly 138 includes multiple head pad subassemblies 180 pivotably joined in a manner so as to allow vertical rotation of one subassembly relative to an adjoining subassembly when the head pad is actuated. Each head pad subassembly 180 may include an upper component comprising a relatively stiff backing portion 140, and a lower component comprising a compressible pad 142. The term 'relatively stiff' means the upper component can provide strength and dimensional stability for the lower component, which can readily deform under pressure. As described hereinabove, the compressible pad 142 can be formed of polyurethane foam, four inches thick in one example, and may be glued to the backing portion 140. In one embodiment of the invention, and as shown in FIG. 14, the backing portion 140 and compressible pad 142 can be overwrapped with a heavy gauge vinyl skin, similar to the vinyl overwrap used on the vertical seals 22, 24.

In one example, the backing portion 140 may be formed from 2×8 plastic or PVC lumber. In another example, the backing portion 140 may be formed from a conveyor belt material, trimmed to the approximate size of the compressible pad 142. The belt material may be a multi-ply construction, having an abrasion-resistant upper layer to withstand environmental elements, and a matte or roughened bottom layer for better adhesion to the compressible pad 142. Non-limiting examples of the upper layer material may include black rubber, nitrile (NBR) impregnated polyester, or polyvinylchloride (PVC). Non-limiting examples of the bottom layer material may include interwoven fabric, monofilament fabric, polyethylene terephthalate (PET) fabric, or non-woven impregnated polyester.

One important property of the plastic wood or belt material relative to the disclosed invention is that both materials are very dense, and therefore of sufficient weight that the simple force of gravity will compress the pad 142 and provide the necessary sealing. This characteristic simplifies the control software governing the movement of the actuator assembly 50. In particular, when lowering the head pad, the sensors and related controls do not need to accurately determine the height of the trailer 5 (which can vary significantly) and position the head pad responsive to that height determination. Rather, once the mere presence of the parked trailer 5 is detected, the actuator drive motor 52 can simply extend the actuator shaft 56 full-travel and the slack in the cable 58 can be taken up in the area above the backing portion 140.

The head pad subassemblies 180A, 180B, 180C are joined by a soft or flexible hinge 144 in a manner that allows each to rotate or pivot relative to the adjoining element. For example, the flexible hinge 144 may comprise a nylon skin. By properly locating the pad bracket 70, essentially the entire weight of all the head pad subassemblies 180 will be concentrated on the lead or first subassembly 180C, and provide a superior seal with the trailer roof. Furthermore, the head pad assembly 138 can be stored such that the first subassembly 180C is rotated to a vertical orientation, which prevents accidental engagement by a trailer yet still fits in a small area underneath the header assembly 64. Also, in the unlikely event a trailer backs into a distended subassembly 180C, it will simply fold backwards and underneath the header assembly without getting damaged.

Figure 16:
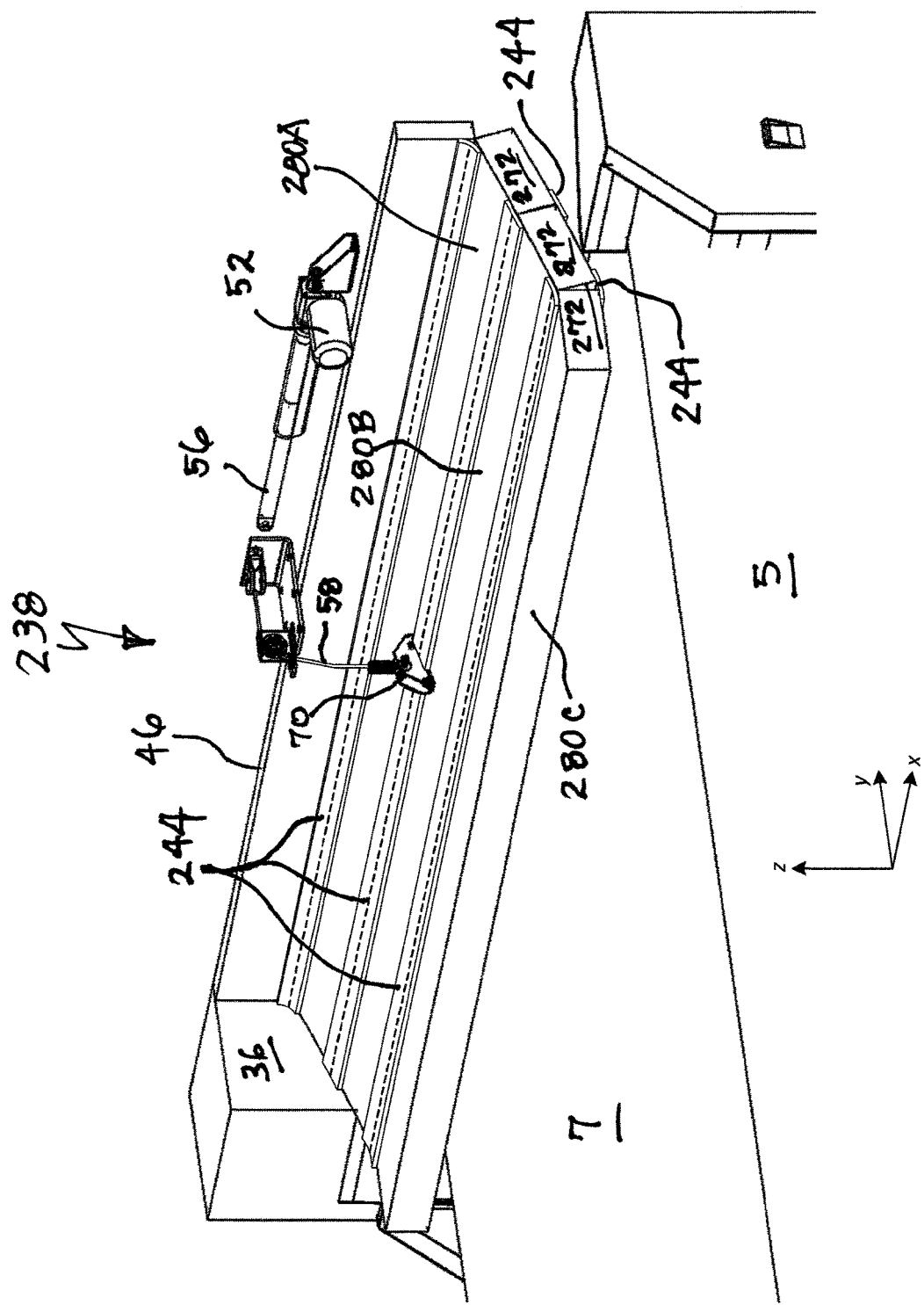
FIG. 16 depicts a perspective view of a head pad assembly according to yet another embodiment of the invention.

FIG. 16 illustrates an exemplary head pad assembly 238 having flexible hinges 244 formed from heavy gauge vinyl skin. The strips may be sewn or otherwise secured to adjoining head pad subassemblies 280. The longitudinal length of each strip (i.e., in the y-direction) can advantageously pre-set or limit the rotational travel between each subassembly 280. For example, by making an upper strip 244 shorter than the bottom strip 244, in one example 3 inches versus 5 inches, one subassembly 280C could rotate relative to the adjoining subassembly 280B approximately 90 degrees upward. However, owing to the shortened flexible hinge 244 on the bottom side, subassembly 280C could only rotate downwards about 30 degrees, which could for example prevent the subassembly 280C from obstructing the door opening 12.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A head pad assembly for a loading dock, comprising:
  a back plate having a forward end and an opposing rear end proximate to a wall of the loading dock;
  a compressible pad coupled to the back plate, the pad positioned above and extending across an opening to the loading dock;
  a hinge element coupled to a stationary structure, the hinge element configured to provide pivotal rotation of the back plate and pad between an upper position and a lower position, wherein the upper position is not configured to provide a sealing function against a trailer, and the lower position is configured to engage and seal the compressible pad against a roof surface of the trailer; and
  a powered actuator assembly comprising a motor-driven actuator configured to raise and lower the back plate and pad between the upper position and the lower position.

2. The head pad assembly according to claim 1, wherein the back plate forms an upper layer of the head pad assembly, and the pad forms a lower layer of the head pad assembly.

3. The head pad assembly according to claim 1, further comprising a header assembly secured to the loading dock wall, wherein the powered actuator assembly is positioned underneath the header assembly to protect the actuator assembly from the weather elements.

4. The head pad assembly according to claim 1, wherein side faces of the compressible pad seal against an inside face of a riser pad when the compressible pad is actuated to the lower position.

5. The head pad assembly according to claim 4, wherein the compressible pad is slightly oversized relative to the back plate.

6. The head pad assembly according to claim 1, wherein a bottom contour of the compressible pad comprises a first angled surface having an angle $\theta_1$ between 2 degrees and 10 degrees, and a second angled surface having an angle $\theta_2$ greater than angle $\theta_1$.

7. The head pad assembly according to claim 6, wherein the second angled surface is between 10 degrees and 30 degrees.

8. The head pad assembly according to claim 7, wherein the contour of the compressible pad further comprises a third angled surface on a rear side of the pad, opposing the first and second angled surfaces, the third angled surface configured to seal against the loading dock wall.

9. The head pad assembly according to claim 1, wherein the stationary structure is the loading dock wall.

10. The head pad assembly according to claim 4, wherein side faces of the compressible pad seal against a front face and an inside face of a riser pad when the compressible pad is actuated to the lower position.

11. The head pad assembly according to claim 1, wherein the motor-driven actuator is a linear actuator.

12. The head pad assembly according to claim 1, wherein the powered actuator assembly comprises a cable and pulley system operable to raise the back plate to the upper position and lower the back plate and pad to the lower position, the cable being slack in the lower position.

13. A mechanically-actuated head pad assembly for a loading dock, comprising:
  a stiff upper backing portion and a lower compressible pad;
  a flexible hinge coupling the upper backing portion along a lateral edge to effect a vertical rotation; and
  a powered actuator assembly comprising a motor-driven actuator configured to raise and lower the upper backing portion between an upper position and a lower position, wherein the upper position is not configured to provide a sealing function against a trailer, and the lower position is configured to engage and seal the compressible pad against a roof surface of the trailer.

* * * * *